United States Patent
Bidet et al.

(10) Patent No.: US 7,548,902 B2
(45) Date of Patent: Jun. 16, 2009

(54) CONTEXT OF USE DIFFERENTIATION IN A POCKET COMPUTER

(75) Inventors: Jérôme Bidet, Evrecy (FR); Anthony Dauguet, Saint Pierre du Fresne (FR); Stéphane Picard, Paris (FR)

(73) Assignee: France Telecom, Paris (FR)

( * ) Notice: Subject to any disclaimer, the term of this patent is extended or adjusted under 35 U.S.C. 154(b) by 446 days.

(21) Appl. No.: 10/968,542

(22) Filed: Oct. 19, 2004

(65) Prior Publication Data

US 2005/0097563 A1    May 5, 2005

(30) Foreign Application Priority Data

Nov. 4, 2003   (FR)   ................................. 03 12908

(51) Int. Cl.
*G06F 17/30* (2006.01)

(52) U.S. Cl. .......................................... 707/2; 707/100

(58) Field of Classification Search ............... 707/2, 707/100

See application file for complete search history.

(56) References Cited

U.S. PATENT DOCUMENTS

| | | | |
|---|---|---|---|
| 5,765,154 A * | 6/1998 | Horikiri et al. ................. 707/10 |
| 5,809,230 A | 9/1998 | Pereira |
| 6,199,064 B1 * | 3/2001 | Schindler ....................... 707/7 |
| 6,339,826 B2 * | 1/2002 | Hayes et al. ................ 713/166 |
| 6,427,140 B1 * | 7/2002 | Ginter et al. .................... 705/80 |
| 6,434,403 B1 * | 8/2002 | Ausems et al. ............ 455/556.2 |
| 6,434,628 B1 * | 8/2002 | Bowman-Amuah ........... 714/48 |
| 6,442,748 B1 * | 8/2002 | Bowman-Amuah ......... 717/108 |
| 6,477,665 B1 * | 11/2002 | Bowman-Amuah ........... 714/39 |
| 6,523,027 B1 * | 2/2003 | Underwood .................... 707/4 |
| 6,549,949 B1 * | 4/2003 | Bowman-Amuah ......... 709/236 |
| 6,636,242 B2 * | 10/2003 | Bowman-Amuah ......... 715/764 |
| 6,671,818 B1 * | 12/2003 | Mikurak ......................... 714/4 |
| 6,704,873 B1 * | 3/2004 | Underwood ................. 726/12 |
| 6,714,928 B1 * | 3/2004 | Calow ............................ 707/4 |
| 7,013,289 B2 * | 3/2006 | Horn et al. ..................... 705/26 |
| 2001/0044321 A1 * | 11/2001 | Ausems et al. .............. 455/556 |
| 2002/0099895 A1 * | 7/2002 | Landron et al. ............. 710/303 |
| 2003/0013483 A1 * | 1/2003 | Ausems et al. .............. 455/556 |
| 2005/0210173 A1 * | 9/2005 | Kehoe et al. ................. 710/260 |

OTHER PUBLICATIONS

Claudia Eckert, "Mobile Devices in eBusiness—New Opportunities and New Risks", Proc. Fachtagung Sicherheit In Informationssystem (SIS), Zürich, Switzerland, Oct. 5-6, 2000.

(Continued)

*Primary Examiner*—Don Wong
*Assistant Examiner*—Kim T Nguyen
(74) *Attorney, Agent, or Firm*—Cohen Pontani Lieberman & Pavane LLP

(57) ABSTRACT

A pocket computer comprising a plurality of programs and data, loading of and access to said programs and data being managed by an operating system. The pocket computer comprises means for selecting one of at least two predefined contexts of use and a context database that comprises a list of associated programs and data for each predefined context of use. In response to selection of a context of use, the operating system interrogates the context database in order to activate from the plurality of programs and data only programs and data associated with said context in the context base.

12 Claims, 6 Drawing Sheets

OTHER PUBLICATIONS

Lars Wirzenius, et al., "The Linux System Administrators' Guide, v0.7", Linux Documentation Project, Nov. 2001, pp. 66-75.

S. Savitzky, "Linux in the Palm of your Hand", Internet document, URL:http://thestarport.org/people/steve/Doc/Linux/linux-in-hand.html, Mar. 31, 2001.

* cited by examiner

CONTEXT OF USE DIFFERENTIATION IN A POCKET COMPUTER

FIELD OF THE INVENTION

The field of the present invention is that of pocket computers and in particular pocket computers of the personal digital assistant (PDA) type.

PRIOR ART

Personal digital assistants are pocket computers which constitute practical and powerful management tools for their users, because of their small size and the resources that they offer (processor, memory). Users take their personal digital assistants with them wherever they go, to assist with managing, processing and/or storing data, irrespective of the context of use, for example business use or personal use.

This type of device originally functioned essentially as an organizer, offering functions such as an electronic appointments diary and address book, calculator, etc. However, with increasing memory and processing capacities, personal digital assistants are now able to support applications like those used on laptop and desktop computers. These applications, and some or all of the data they use, are generally dedicated to a single context of use (business use, personal use, etc.).

Consequently, there coexist within one and the same device heterogeneous programs and data that users must sort for themselves as a function of the context of use. For example, the technology currently offered on personal digital assistants undoubtedly makes it possible to create a personal address book and a business address book, but only within the same overall address book (i.e. the same application). Similarly, this technology enables the installation of business applications and personal applications, but only on the same application menu. Finally, the current technology allows the creation of business and personal document files, but only in the same directory. Users therefore have to rely on memory to determine which applications and data relate to the current context of use. However, it soon becomes impossible for users to remember the context of use for each program and each file. This makes the PDA considerably less user friendly and leads to a high risk of confusion in the processing of information. Thus existing devices provide no formal distinction between programs and data for business use and programs and data for personal use, for example. The result for users is confusion of content media, because users are unable to distinguish tools for personal use from tools for business use, as they are all present and available regardless of the context of use.

This requirement to differentiate the context of use in this type of device becomes imperative in view of the current increase in the interpenetration of contexts of use, in particular because of the growth of peripatetic forms of working, teleworking, etc.

OBJECT AND SUCCINCT DESCRIPTION OF THE INVENTION

The present invention aims to remedy the problems cited above and to propose a solution to enable users of PDA-type pocket computers to have a working environment (software, data, etc.) appropriate to each predefined context of use.

The above objects are achieved by a method for differentiating programs and data in a pocket computer according to at least two predefined contexts of use, the loading of programs and access to data being managed by an operating system. The method comprises the following steps:

a) forming a context database in which a list of associated programs and data is defined for each predefined context of use, from all programs and data stored in the pocket computer, b) selecting one of the predefined contexts of use, c) storing the selected context of use in the context database as the current context in response to the selection of a context of use, and d) interrogation of the context database by the operating system to identify the current context and activate programs and data associated with the current context in said base.

Accordingly, using the method of the invention, the user is able to set parameters held in a database for programs and data stored in the device as a function of a plurality of predefined contexts of use (e.g. personal use and business use). The operating system then uses this base to identify the current context of use chosen by the user and programs and data associated only with that context of use. Thus it is possible to offer the user a working environment (list of available programs and data) that is entirely dedicated to a context of use defined by the user in the context base. Consequently, regardless of the context of use, there is no longer any risk of confusion between the tools and information contained in the device.

Because some tools, such as the diary, for example, are useful in all contexts, in step a) a portion of the programs and data may be associated with more than one predefined context of use.

To offer the user a working environment dedicated to the selected context of use, in step d) the operating system constructs an access menu to programs and data comprising only programs and data identified for the current context.

Steps b) to d) may be executed automatically when the computer is started up or during operation, at the initiative of the user, by the user operating context of use selection means on the device.

When starting a program or an application, the operating system interrogates the context database in order to launch the program with the data associated with the current context in the context database. In this way, the user will have access only to data pertinent to the context of use.

The invention also provides a pocket computer comprising a plurality of programs and data, loading of and access to said programs and data being managed by an operating system. According to the invention, the pocket computer comprises means for selecting one of at least two predefined contexts of use and a context database that comprises a list of associated programs and data for each predefined context of use. In response to selection of a context of use, the operating system interrogates the context database in order to activate from the plurality of programs and data only programs and data associated with said context in the context base.

To enable the user to select one of a plurality of predefined contexts, the device may comprise physical controls such as buttons, each corresponding to a different context. In one variant, selection may be effected directly on screen by using display means reacting to control means such as a stylus, for example.

According to one aspect of the invention, the pocket computer includes software for constructing an access menu to programs and data comprising only programs and data associated with the context in the context base.

BRIEF DESCRIPTION OF THE DRAWINGS

Other features and advantages of the invention emerge from the following description of particular embodiments of the invention, given by way of non-limiting example and with reference to the appended drawings, in which.

DETAILED DESCRIPTION OF EMBODIMENTS OF THE INVENTION

The present invention relates to personal digital assistants, which are small pocket computers that are known in the art and comprise, reduced to their own scale, the basic resources encountered in standard computers. To be more precise, personal digital assistants comprise processing means, such as a processor for executing programs, and memory means, for storing data. To enable and manage the execution of programs, the PDA comprises an operating system such as the WindowsCE® operating system. As is well known in the art, the operating system is the entity that manages all the programs and in particular the application software and the corresponding data that is stored in the device. This is why, as explained in detail below, the solution provided by the present invention consists in providing means for setting parameters of applications and data contained in the digital assistant according to each context of use, in order to enable the operating system to recognize and dissociate applications/data as a function of the selected context of use. Accordingly, after selecting a predefined context of use on the PDA, the user's working environment groups together only applications and data associated with that context.

Figure 1:
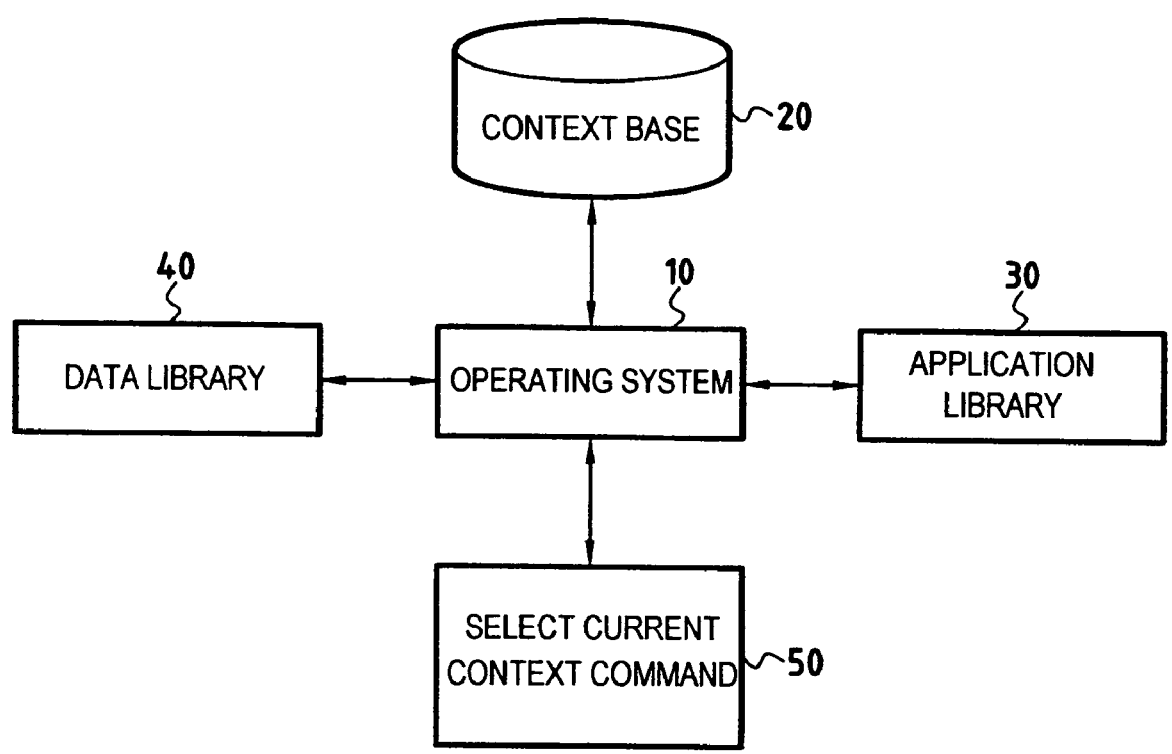
FIG. 1 is a diagrammatic overview of the system of the invention.

FIG. 1 is a simplified diagram showing the relations between the main units of a personal digital assistant conforming to the invention. As shown in FIG. 1, the PDA comprises an operating system 10 that is responsible for managing applications and data. The applications and data contained in the PDA are here represented in the form of an application library 30 and a data library 40, respectively, both of which can be accessed by the operating system. How the operating system manages applications and data (menu of available applications, calling up and executing applications, storing data in files, etc.) is well known in the art and is not described in detail here, to simplify the description. The operating system 10 is also connected to a context of use database 20 referred to below as the "context base" and to selection means 50 enabling the user to select one of a plurality of predefined contexts of use.

Figure 2:
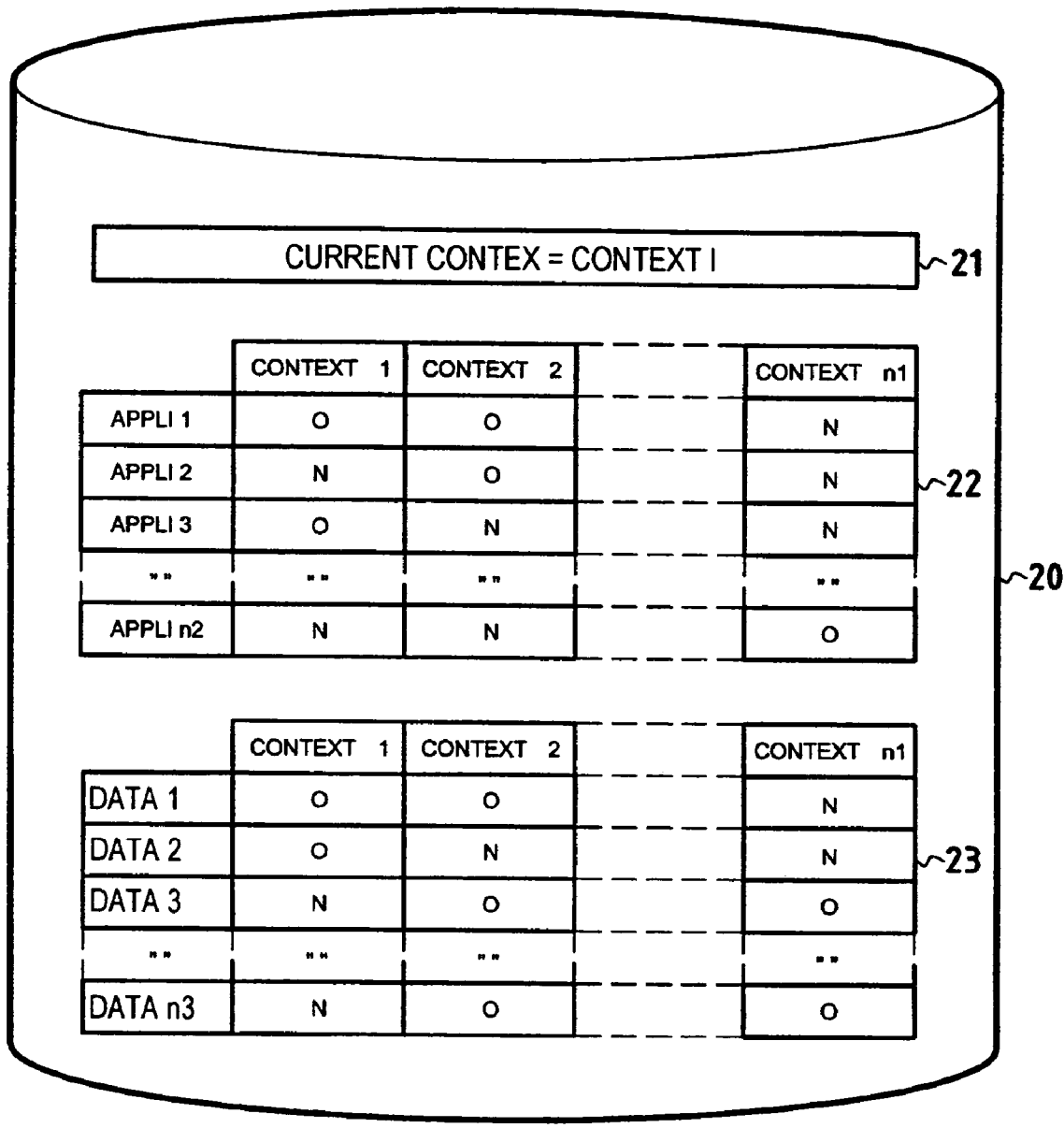
FIG. 2 shows one example of the structure of a context database of the invention.

It is in the context base 20 that users set parameters of applications and data contained in the assistant as a function of various contexts of use that they wish to be able to identify on their own PDAs, such as a business context of use and a personal context of use, for example. To this end, as shown in FIG. 2, the context base 20 comprises two tables 22, 23 for setting parameters of applications and data, respectively. For setting parameters of applications, the user writes in the table 22, indicating the associated applications (appli 1, appli 2, . . . , appli n2) for each context (context 1, context 2, . . . , context n1). In the example shown in FIG. 2, the letter "O" indicates that the application is valid for the context concerned and the letter "N" indicates that the application may not be used in that context. The user proceeds in the same way for the data (data 1, data 2, . . . , data n3), writing in the table 23.

In the FIG. 2 example, it is seen that certain applications, such as "appli 1", and certain data, such as "data 1", are valid in more than one context of use, here "context 1" and "context 2", which are respectively a business context of use and a personal context of use. This is because certain applications and/or data may be used in more than one context. This applies to managing the diary, for example, which will be common to business use and personal use. It may be useful to be able to display and manage together a business diary and a personal diary, to prevent conflicts in the management of the user's time. It is nevertheless always possible for the user to make a distinction between business appointments and personal appointments by including different modes of access management in the data table 23.

However, applications such as managing a photo album or games and data relating to them are specific to personal use (context 2 in FIG. 2). Such applications may correspond to "appli 2" in table 22, i.e. an application marked "O" only for "context 2". On the other hand, database management or sales administration software, for example, are specific to business use (context 1 in the figure). This software may correspond to "appli 3" in table 22 because it is valid for "context 1" (marked "O") and is not valid for "context 2" (marked "N").

The context base 20 also comprises a table 21 in which the current context is stored. As explained below, users are able to select a context of use on start-up or while using their personal digital assistants. The context selected is then stored as the current context in table 21 of the context base, enabling the operating system and applications to identify the current context and make available to the user applications and data for which the parameters have been set accordingly for the selected context in tables 22 and 23.

The context base shown in FIG. 2 is merely one example of a database structure that may be used for the present invention. The person skilled in the art will be able to envisage without difficulty many different structures for the context base.

Figure 3:
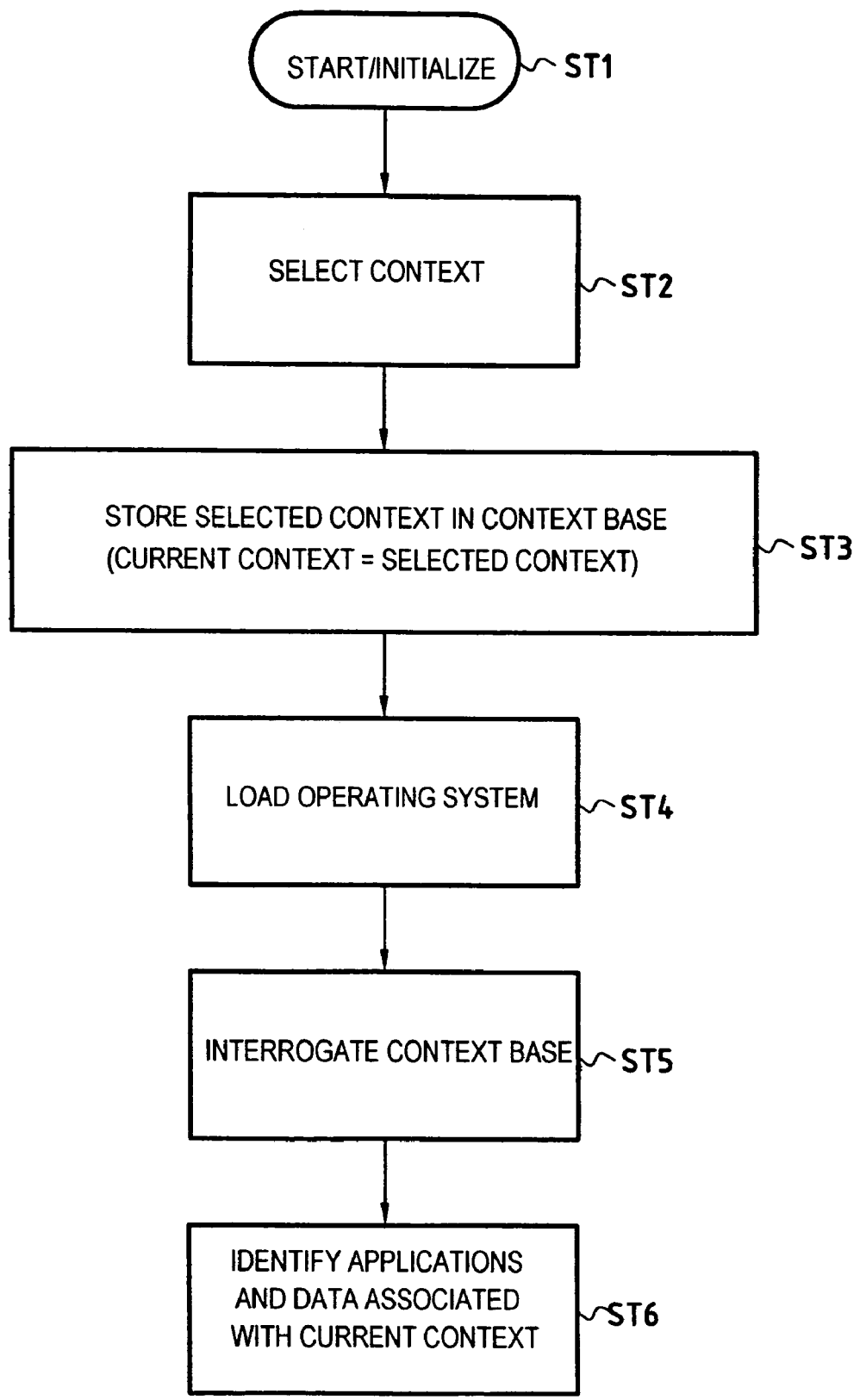
FIG. 3 is a flowchart showing the steps of the method of the invention executed when starting up the device.

The steps executed on starting up a personal digital assistant conforming to the present invention are described next with reference to FIG. 3.

When users switch on their personal digital assistants (step ST1), they select the context in which they wish to use them (step ST2). For example, a user may have defined two contexts beforehand, namely a business context and a personal context, in the manner described above. The user may select the context of use in various ways. For example, the user may use a selector button on the PDA. In this case, the context may be selected by pressing an on/off button (a different context is offered each time the button is pressed, for example) or a predefined access button, a different button corresponding to a specific context in this case. Alternatively, the user may select a context from a start menu displayed on the screen of the PDA. Of course, other selection means that may be envisaged but are not described here because they are well known in the art.

When the context of use has been selected, it is stored in the context base as the current context (step ST3) to ensure that there exists in the PDA an indication of the nature of the current context of use to which the operating system and applications may refer. Accordingly, on being loaded, the operating system (step ST4), interrogates the context base (step ST5) in order, on the basis of the stored current context, to identify and activate applications and data associated with the current context, for which the user has set the parameters accordingly in the context base.

These operations may be carried out using the "multiboot" operating system management technology, for example. Thanks to memory sharing, this technology provides a plurality of operating system versions or configurations on the same device. It is therefore possible to choose which version of the operating system to load when the device is started up. In the present invention, each version of the operating system corresponds to a predefined context of use which, once selected, identifies the associated applications and data in the context base (step ST5).

Users then have a working environment on the PDA that is entirely dedicated to the context of use that was selected on start-up, i.e. users can access only applications and data for which the context parameters have been set accordingly. This dedicated user environment may take the form of a menu offering only applications and data associated with the context for which the parameters have been set accordingly in the context base. In this case, after identifying the associated applications and data, the operating system constructs, when it is loaded, a corresponding menu in the same manner as for the start menu of the WindowsCE® system, for example.

Figure 5:
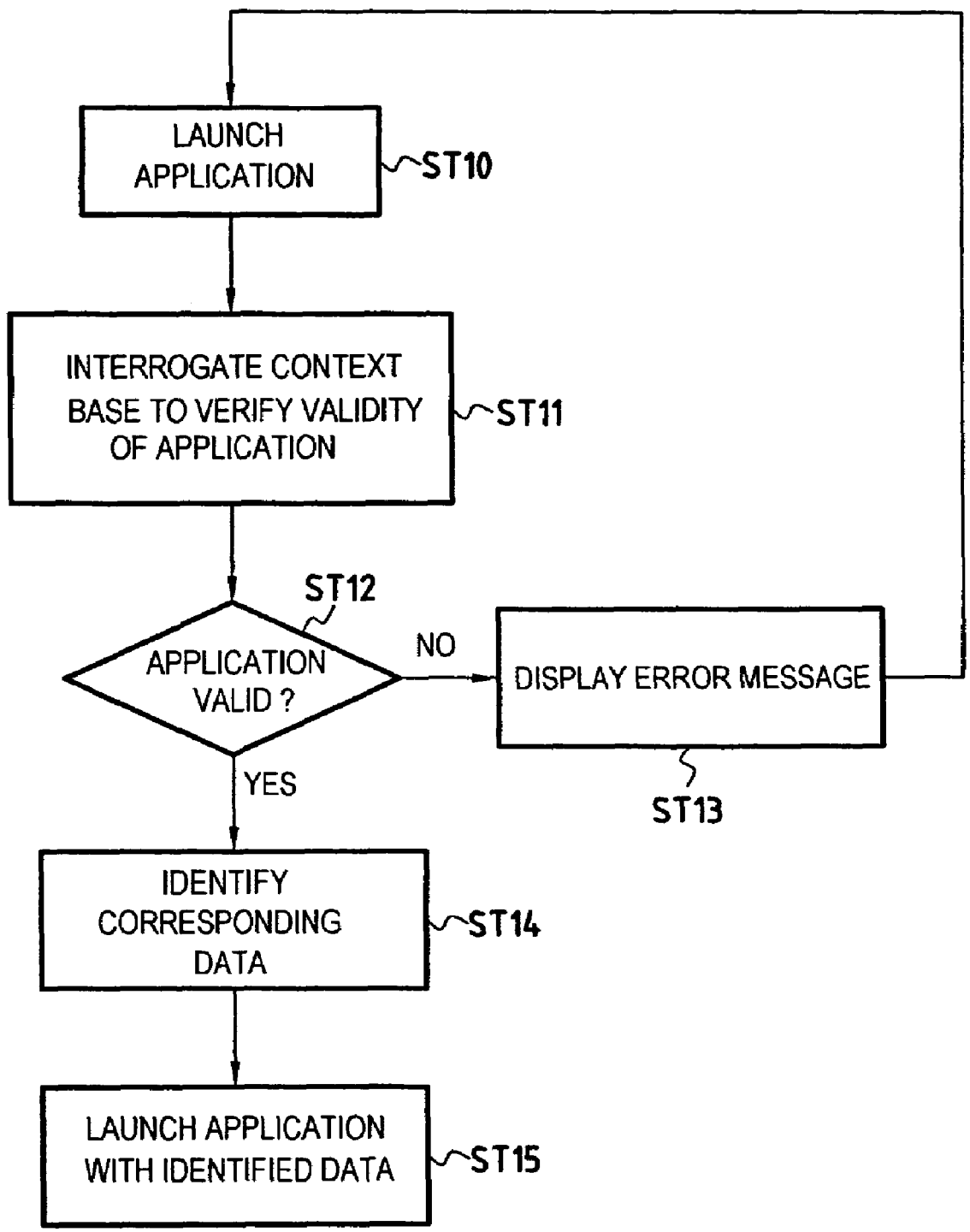
FIG. 5 is a flowchart showing the steps of the method of the invention executed when launching a program or an application.

FIG. 5 shows the steps executed on launching an application within a current context of use. Once the PDA has been initialized in a defined context of use, the user launches one or more applications (step ST10). Applications are launched under the control of the operating system, which interrogates the context base to check that the application the user wishes to launch is valid for the current context (step ST11). To this end, the operating system reads the table 22 of the base 20 to determine whether the application concerned has the parameter for the current context marked "O" or "N" (step ST12). If the application requested is not valid, an error message is displayed (step ST13). If the application is recognized for the current context, the data associated with the application is identified in the table 23 (step ST14) and the application is launched with that data. The user can then access with the application only data for which the parameters have been set for the chosen context of use. Verifying the validity of the applications and/or data as a function of the current context may be avoided by proposing to the user only applications and data valid for the current context. This may be effected by displaying menus and directories showing only the files concerned or by distinguishing valid files from other files (special icons, colors, "grayed out" characters, etc.).

In the present invention, the context of use may also be selected during use. Accordingly, it is additionally possible for users to move from one context to another so that, regardless of the applications selected in a given context, it is nevertheless possible for them to consult an application and/or data specific to another context, and then to return to the original context if necessary. This further improves the flexibility and user friendliness of the PDA. Consider the situation of a user who wishes to create and store data for personal use while working on an application that creates data (e.g. word processing) but which was launched in a business context of use. With the possibility of changing context during use that the device of the invention provides, it is entirely possible for the user to create data using the application in the business context and to store it in the personal context, provided that the application concerned is common to both contexts. In this case, it is sufficient for the user to go from the business context to the personal context only to record data in a file, or whatever, and then to return to the business context to continue working. The user is therefore able to change context momentarily during use without having to restart the PDA.

Figure 4:
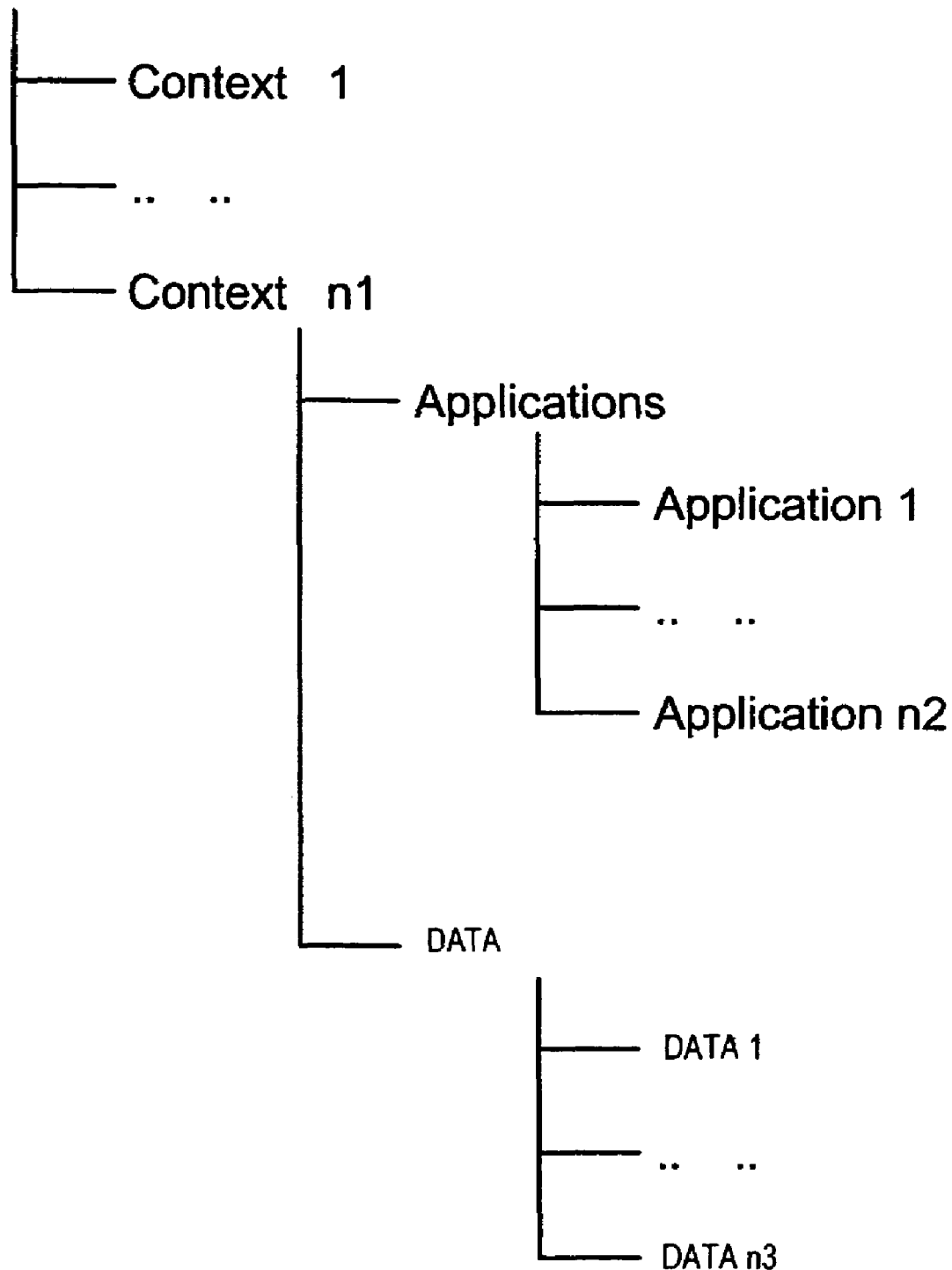
FIG. 4 shows one example of the structure of a register base that may be used by the invention.

To this end, for the operating system to be able to refer to the context base not only when it is loaded on start-up but also during use, a register base may be used in which the defined contexts and the associated applications and data are placed. FIG. 4 shows one example of the structure of this kind of register base. As is well known in the art, a register base is a database specific to the operating system in which all the configuration parameters of the applications are stored, both for the software and for the hardware. Accordingly, on each change of context corresponding to a new loading of the operating system, the configuration of use corresponding to the selected context is established as a function of the parameters stored in the register base. Moreover, this method of implementing the invention has the advantage of being easy and economical to integrate into existing devices. Operating systems such as WindowsCE® currently provided in personal digital assistants already comprise a register base for configuring the device.

Figure 6:
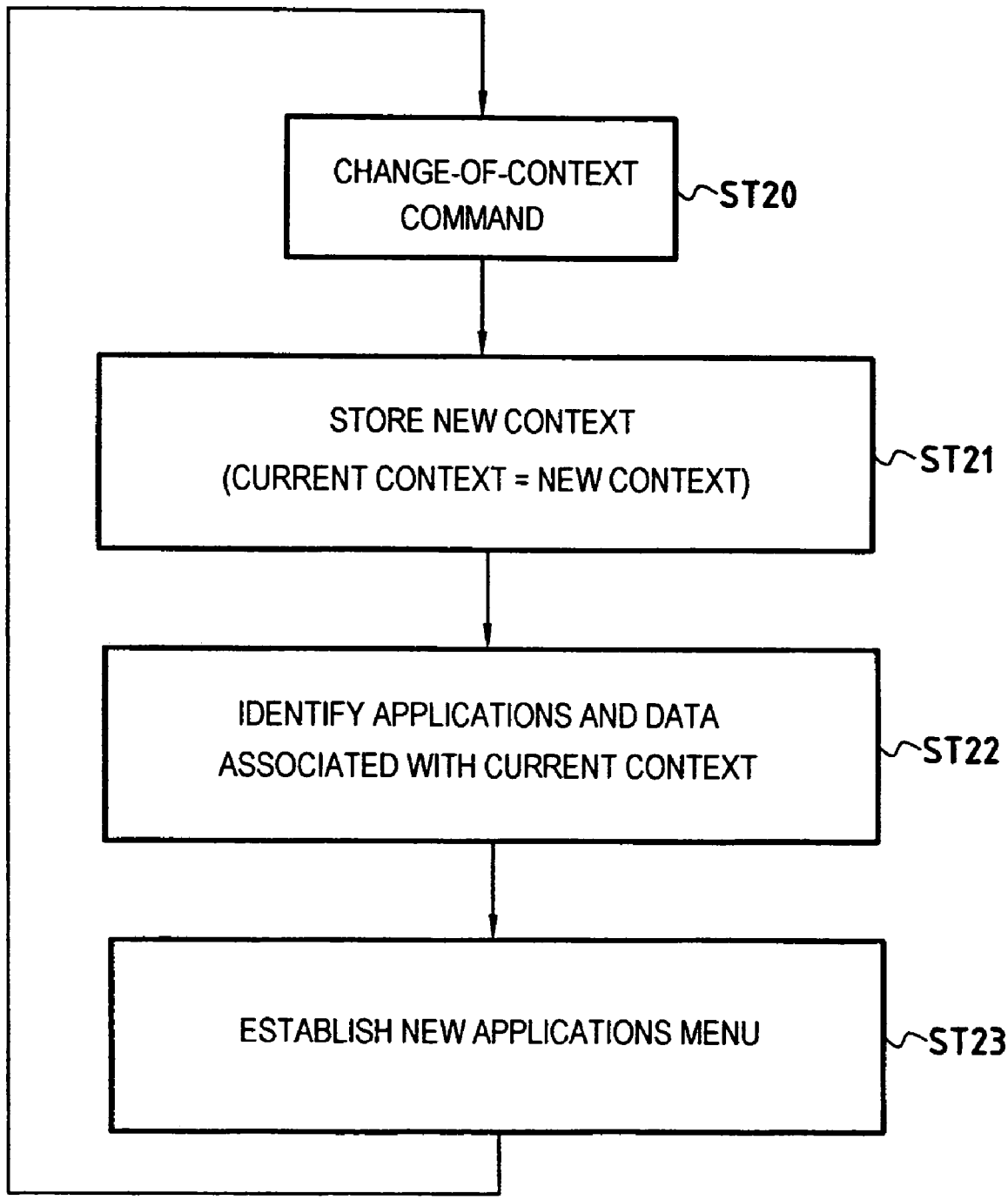
FIG. 6 is a flowchart showing the steps of the method of the invention executed when changing the context of use during operation of the device.

FIG. 6 shows one example of a change of context during use. The user commands the change of context using the selection means on the PDA (step ST20). As described above, the selection means may comprise buttons, a menu showing the contexts, etc. When the new context of use has been selected, it is stored in the context base 20 by writing in the table 21 to modify the current context (step ST21). The operating system then identifies the applications and data associated with the new context in order to update the list of valid applications and data (step ST22). From the updated list, the operating system establishes a new application menu (e.g. "start menu") for the user (step ST23). If users wish to change context only momentarily and then return to the original context, it is sufficient for them to command another change of context (step ST20), the remainder of the operations (steps ST21 to ST23) being automatic.

What is claimed is:

1. A method of managing access to programs and data in a pocket computer according to at least two predefined contexts of use, wherein loading of the programs and accessing the data is managed by an operating system, said method comprises the following steps:

a) enabling a user to set parameters that are stored in a context database for said programs and data to indicate which programs and data are associated with each of said at least two predefined contexts of use b) selecting one of said at least two predefined contexts of use;

c) storing the selected predefined context of use in the context database as a current context of use in response to the selecting of the one of said at least two predefined contexts of use;

d) loading the operating system; and e) during loading of the operating system, interrogating the context database by the operating system to identify the current context of use, and loading said current context of use to provide a user with a working environment that enables the user to activate programs and access data that are associated with the loaded current context of use, wherein only programs and data that are associated in said context database with the loaded current context of use may be activated or accessed, and programs and data that are not associated with said loaded current context of use can only be activated or accessed by reloading said operating system to load another context of use that is associated with at least some of the programs and data that are not associated with the loaded current context of use.

2. A method according to claim 1, wherein, in step e), a portion of the programs and data is associated with a plurality of predefined contexts of use.

3. A method according to claim 1, wherein, in step e), the operating system constructs an access menu to programs and data comprising only programs and data identified for the current context.

4. A method according to claim 1, wherein steps b) to e) are executed automatically when the computer is started up.

5. A method according to claim 1, wherein steps b) to e) are executed during operation in response to user action on selection means.

6. The method according to claim 1, further comprising interrogating by the operating system the context database to launch the program with the data associated with the current context of use in the context database.

7. A pocket computer comprising:
an operating system;
programs and data, wherein loading of said programs and access to said data is managed by the operating system;
means for enabling a user to set parameters to be stored in a context database for said programs and data to indicate which programs and data are associated with each of at least two contexts of use;
means for selecting one of said at least two predefined contexts of use;
means for storing the selected context of use in the context database as the current context in response to the selecting one of said at least two predefined contexts of use;
means for loading said operating system;
wherein, during loading of the operating system and in response to selecting one of said at least two predefined contexts of use, the operating system is adapted to:
interrogate the context database to identify the current context of use; and
load said current context of use to provide the user with a working environment that enables the user to activate programs and access data that are associated with the loaded current context of use,
wherein only programs and data that are associated in said context database with the current context of use may be activated or accessed, and programs and data that are not associated with said loaded current context of use can only be activated or accessed by reloading said operating system to load another context of use that is associated with at least some of the programs and data that are not associated with the loaded current context of use.

8. The pocket computer according to claim 7, including physical controls for selecting one of the predefined contexts of use.

9. A pocket computer according to claim 8, including display means for selecting one of the predefined contexts of use.

10. A pocket computer according to claim 7, including software for constructing an access menu to programs and data comprising only programs and data associated with the context in the context base.

11. The method according to claim 1, wherein said pocket computer includes a plurality of operating system versions or configurations, and each version or configuration corresponds to a predefined context of use.

12. The pocket computer according to claim 7, further comprising a plurality of operating system versions or configurations, each version or configuration corresponding to a predefined context of use.

* * * * *